United States Patent
Dabrush et al.

[15] 3,639,992
[45] Feb. 8, 1972

[54] CHORD LENGTH GAUGE

[72] Inventors: Charles Dabrush; Irving Strauss, both of Monsey, N.Y.

[73] Assignee: Chromalloy American Corporation, West Nyack, N.Y.

[22] Filed: Jan. 15, 1970

[21] Appl. No.: 3,143

[52] U.S. Cl. ..........................33/174 PA, 33/174 P, 33/174 L
[51] Int. Cl. ....................G01b 3/20, G01b 5/20, G01b 5/28
[58] Field of Search..............33/174 C, 174 P, 174 L, 174 PA

[56] References Cited

UNITED STATES PATENTS

| | | | |
|---|---|---|---|
| 2,495,891 | 1/1950 | Davis | 33/174 C |
| 2,359,018 | 9/1944 | Balk | 33/174 S |
| 3,427,723 | 2/1969 | Leckey | 33/174 P |
| 2,839,836 | 6/1958 | Fuller | 33/174 PA |
| 3,102,344 | 9/1963 | Herman | 33/174 PA |

*Primary Examiner*—Leonard Forman
*Assistant Examiner*—Paul G. Feldes
*Attorney*—Curtis, Morris & Safford

[57] ABSTRACT

A measuring instrument to take a continuous reading of the variations in the chord lengths of airfoil vanes having an edge defined as a straight line. The instrument is adapted to determine whether the variations are within an acceptable range and readings are taken by a sliding dial gauge calibrated to indicate the acceptable range along an airfoil vane.

5 Claims, 5 Drawing Figures

INVENTORS
CHARLES DABRUSH
IRVING STRAUSS

INVENTORS
CHARLES DABRUSH
IRVING STRAUSS

CHORD LENGTH GAUGE

The present invention relates to measuring instruments and in particular to a device for measuring variations in the chord lengths of turbine engine vanes.

Turbine engine vanes are a vital component of jet engines and their surface and edge dimensions must conform to exacting specifications. These dimensions must be carefully checked before a vane can be used in an aircraft engine. In addition vanes which have been in use for a period of time in a jet engine are subjected to high temperatures which cause oxidation and erosion. This oxidation and erosion cause the vanes to deteriorate, requiring that the vanes be overhauled and repaired for reuse. Repair is an economic necessity and is achieved by a coating process wherein the dimensions of the repaired vane must conform to repair specifications established by the aircraft industry.

One critical dimension of these vanes is the chord lengths of a vane's airfoil. The chord length of a vane is defined as the straight line dimension of any section of the vane between its leading and trailing edges. The exact chord length specified for each section of a particular vane varies but any variation in that length must be within a specified range of minimum and maximum chord lengths.

In production lines for new and repaired vanes it is desirable to check all of the chord lengths of a vane in a continuous one step operation. Heretofore optical comparators have been primarily utilized for this purpose, and, with these devices, only a single contour or chord could be measured at one time.

It is an object of this invention to provide an apparatus to measure chord length variations in turbine engine vanes along one edge of the vane. It is a further object of this invention to provide an apparatus to measure chord length variations in a turbine engine vane in a continuous one step operation. It is another object of the invention to provide an apparatus to compare the chord length variations of a turbine engine vane with a standard range of permissible variations. It is still a further object of the invention to provide a simple and inexpensive device for determining variations in airfoil vane chord lengths.

In accordance with the preferred embodiment of the invention there is provided an instrument for measuring the chord length variations of a turbine engine vane having one edge defined as a straight line. Theoretically this edge lies on a straight line extending between two points on the vane's trailing edge located on known sections of the vane adjacent each of its end buttresses. When each of these sections have a minimum permissible chord length, L min, the line defined by the points on the vane edge on said sections physically defines the minimum chord length for all intermediate sections of the vane since according to design standards each of these chords must lie on, or extend beyond, this line, if the vane has a chord length that is the minimum specified length or greater. This line, therefore, represents the minimum straight line edge of any given vane of a particular type.

A maximum chord length, L max, is also defined by design standards and no chord may extend beyond the minimum straight line edge more than a specified distance; thus a permissible range of chord length variations is established.

The measuring device of the present invention provides a support plate having a plurality of contact dowels thereon whereby when a turbine vane is positioned on the dowels, the specified end sections are located and the line defining minimum chord length, i.e., the minimum straight line edge, for the entire vane is located. A dial gauge having an operating stem which includes a contact wheel is slidably mounted parallel to this line and this contact wheel is adapted to engage the trailing edge of the vane. The gauge is set to read zero along the minimum straight line edge of a vane, for example by a calibration block which can be positioned on the support plate in a location through which this line theoretically extends. In addition, the face of the gauge includes indicia to indicate the permissible range of chord variations above zero to the maximum permissible chord length. Thus as the calibrated dial gauge is slid parallel to the minimum theoretical straight line trailing edge its contact wheel engages the theoretically straight edge of the vane and indicates variations in the location of this edge with respect to the minimum straight line and also whether these variations are within the permissible range indicated on the face of the dial.

The construction of the preferred embodiment as well as further objects and advantages thereof will become further apparent from the following specification when considered in conjunction with the accompanying drawings wherein.

Figure 1:
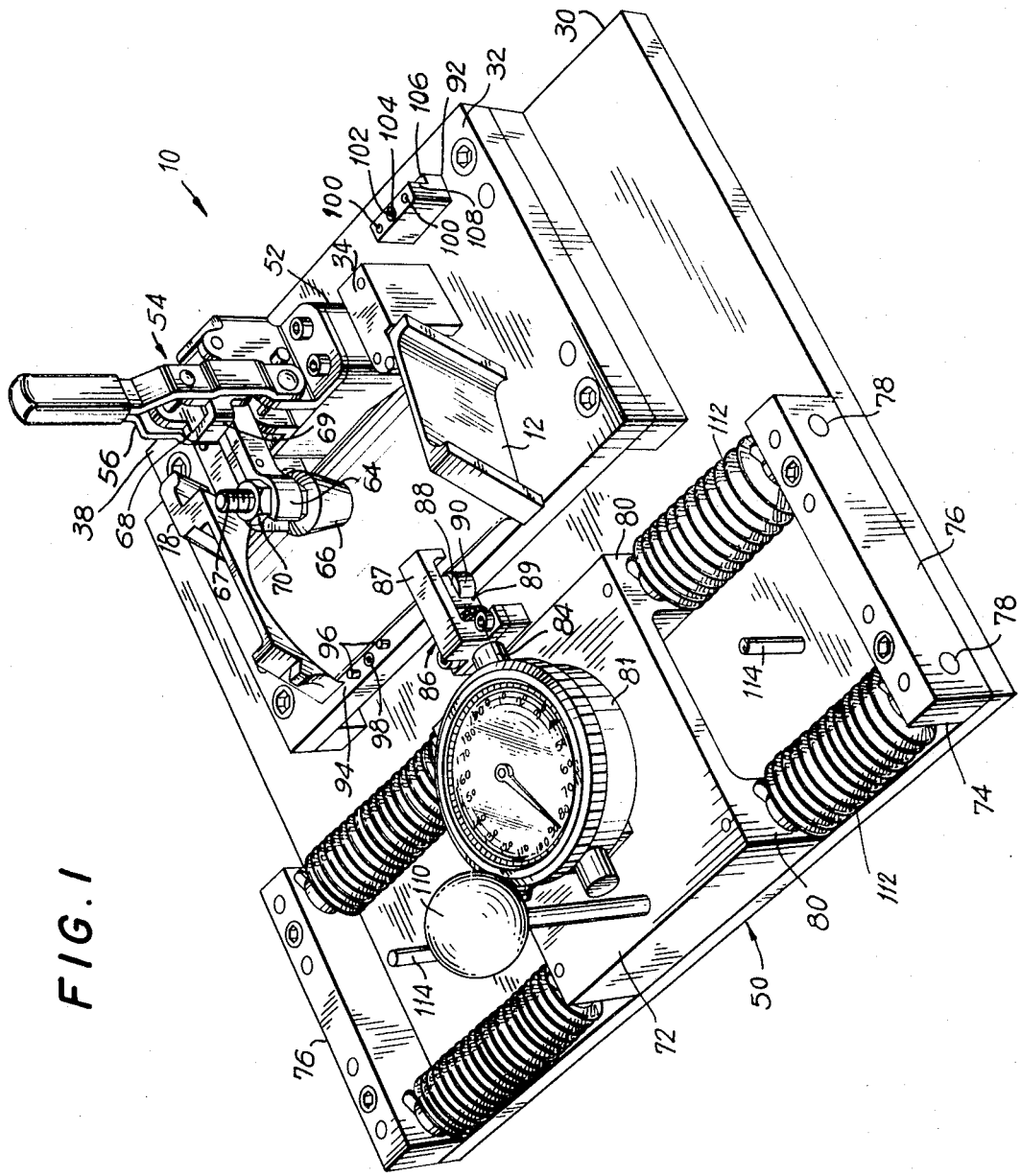
FIG. 1 is a perspective view of the measuring instrument of the present invention with a turbine vane positioned therein for measurement.

Referring now to the drawings, and in particular to FIG. 1, there is shown a measuring instrument 10 on which is seated a turbine engine vane 12 whose chord lengths are to be checked. The instrument includes a vane support platform 32 and a dial gauge assembly 50 having a slidably mounted gauge 81 which indicates variations in chord lengths along the trailing edge of the vane.

Figure 4:
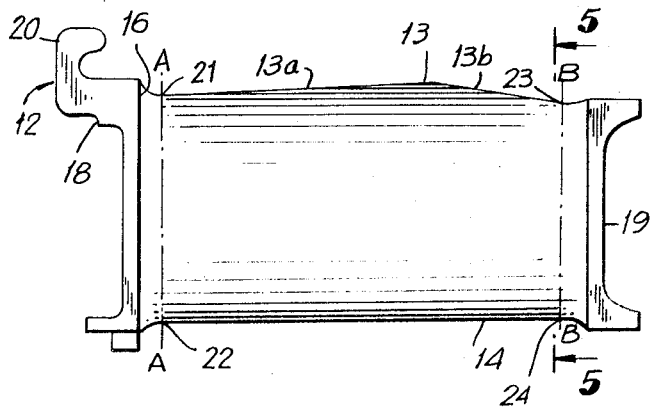
FIG. 4 is a top plan view of a turbine vane to be measured by the present invention.
Figure 5:
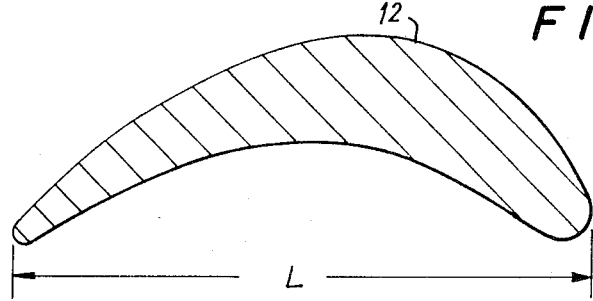
FIG. 5 is a sectional view of the vane taken on line 5—5 of FIG. 4.

The chord length of turbine engine vanes is defined by the dimension L of the vane's airfoil (See FIG. 5). The length L of certain sections of a vane are defined by design specifications and in addition the trailing edge 14 of a vane is specified to be a straight line (Note FIG. 4). The various defined chord lengths are located from the reference surface 16 on the inner surface of vane buttress 18. Alternatively, the defined chords may be located from buttress reference surface 20. In either case, by locating two of the defined chords, two points on the trailing edge 14 are also located and thus the theoretically straight line on which this edge lies is defined. For the vane illustrated in FIGS. 4 and 5 the spaced defined sections, adjacent the roots of buttresses 18 and 19, designated A—A and B—B, intersect trailing edge 14 at points 22 and 24, respectively. Accordingly, the straight line extending between these points defines the theoretical line on which edges 14 should lie.

For a given class of vanes 12 the minimum (L min) and maximum (L max) dimensions of sections A—A and B—B are specified. Therefore, since trailing edge 14 must theoretically be a straight line, where sections A—A and B—B have their minimum dimensions, each chord section between A—A and B—B must have its trailing edge on, or extending beyond, the line defined by points 22 and 24. Thus the minimum chord length for every chord of the vane is defined by the line 22—24. This line is hereinafter referred to as the minimum straight line trailing edge for vane 12. The maximum length L (L max) of each chord is specified to be a certain distance beyond its minimum length (L min) and, accordingly, beyond the minimum straight line trailing edge. In this manner a permissible range of chord length variation is established along the entire trailing edge of the vane. Thus, it has been found that by establishing the theoretical location of the minimum straight line trailing edge for a class of vanes, any variation in the length of any chord in a particular vane may be determined by comparing the entire trailing edge of the vane with the established theoretically straight line.

Figure 2:
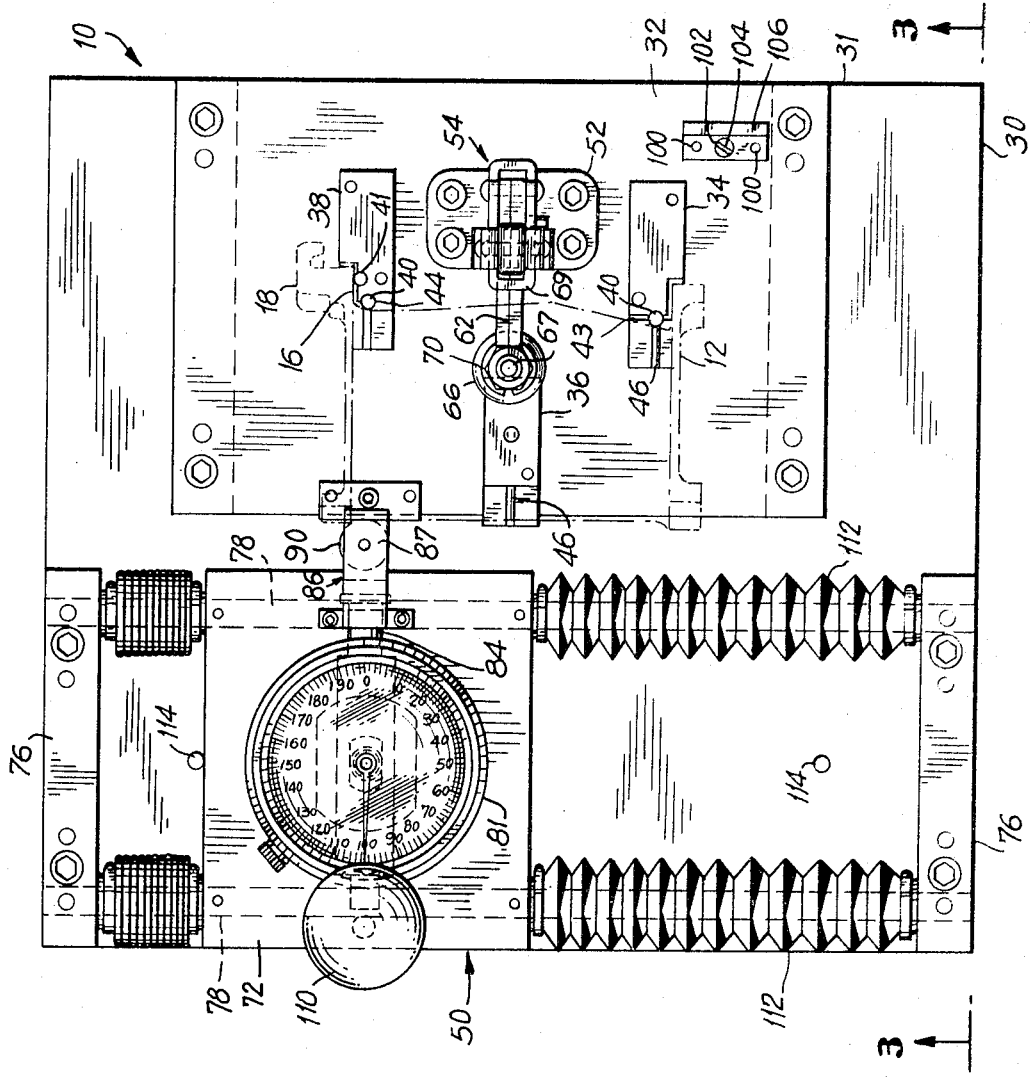
FIG. 2 is a top plan view of the instrument illustrated in FIG. 1 with the turbine vane shown by phantom lines.
Figure 3:
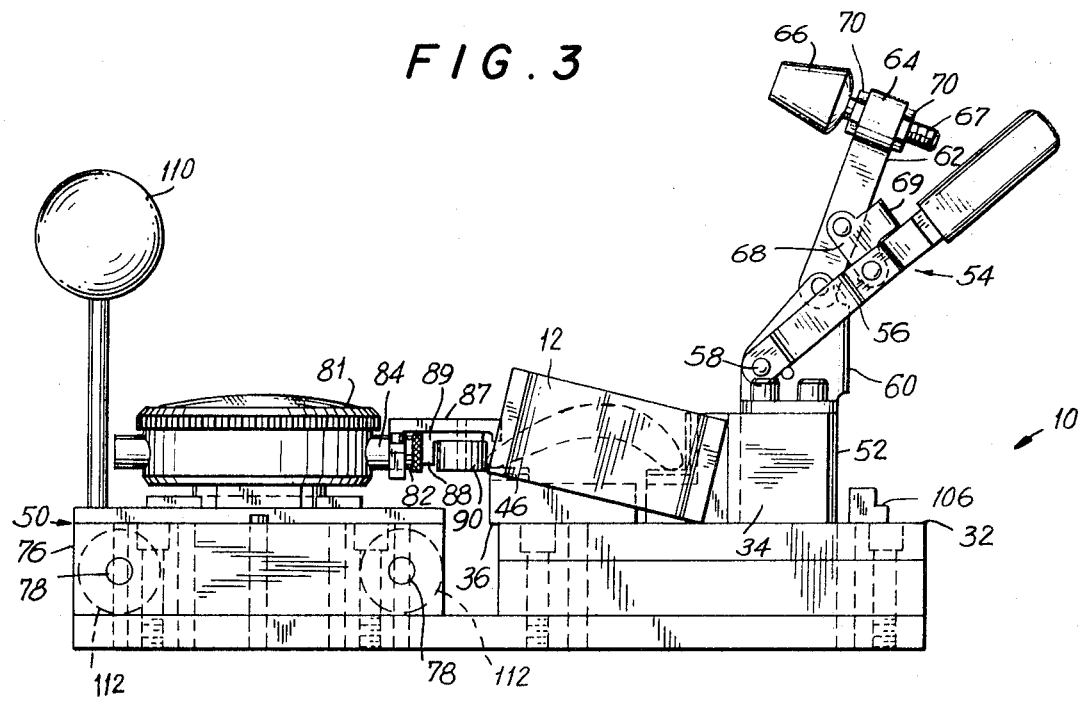
FIG. 3 is a view taken on line 3—3 of FIG. 2 but with the retaining clamp in its opened position.

The instrument 10 illustrated in FIGS. 1–3 is thus designed to permit accurate continuous measurement along trailing edge 14 of vane 12 to compare the location of that edge with the theoretical minimum straight line for a particular class of vanes. In this manner, variations from the minimum straight line edge, and whether these variations lie within a permissible range can be determined.

Measuring instrument 10 includes a base plate 30 on which is mounted a van support platform 32. The vane 12 is supported on platform 32 by three support blocks 34, 36 and 38. Blocks 34 and 38 are fixed in position on platform 32 and each includes a vertically extending carbide contact dowel 40. These blocks are longitudinally spaced a distance equal to the prescribed distance between sections A—A and B—B of vane 12. Block 38 includes a second vertical contact dowel 41 which is adapted to contact reference surface 16 of buttress 18 when vane 12 is seated on the support. Dowel 41 is positioned with respect to dowels 40 such that when vane 12 is seated on support blocks 34 and 38, points 21 and 23 on the leading edge 13 of vane 12 contact dowels 40. Since these points, 21 and 23, are the points at which sections A—A and B—B intersect leading edge 13, the sections themselves are located, and the location of the theoretically minimum straight line edge is established.

As seen in FIG. 2, the vertical faces 42 and 44 of blocks 34 and 38 respectively, are offset with respect to each other. This positioning is due to the fact that the leading edge 14 of vane 12 is required to be formed with a pair of angularly related sections 13a and 13b which, as seen in FIG. 4 cause the points 21 and 23 to be offset. Accordingly, in order to position trailing edge 14 along a line parallel to edge 31 of base plate 30, for reasons more fully explained hereinafter, the vertical faces 42 and 44 of blocks 34 and 38 are offset a sufficient distance to compensate for the offset of points 21 and 23.

Each of the support blocks 34, 36, and 38 include a horizontal contact dowel 46 on which vane 12 rests. These dowels serve to maintain the vertical attitude of the vane in the proper position so that trailing edge 14 may be transversed by dial gauge assembly 50, as seen in FIG. 3. It is noted that block 36 supports the under surface of trailing edge 14 and does not interfere with the operation of the dial gauge assembly. It is also noted that all of the contact dowels used are cylindrical so that there is minimum contact between vane 12 and its support members; thereby minimizing the possibility of damage to vane 12.

Located between support blocks 34 and 38 on platform 32 is a mounting block 52 which provides support for a conventional break back clamp 54. Clamp 54 includes a bifurcated handle 56 pivoted at 58 to a mounting piece 60 which is bolted to block 52. One of the links, 62, of clamp 54 is pivotally connected to member 60 and serves as a clamping arm to hold vane 12 on the support blocks in order to maintain the vane's position relative thereto. The free end of arm 62 includes an enlarged portion 64 having a bore or opening therein for receiving clamp contact member 66. Member 66 is adjustably mounted by its threaded stem 67 and nuts 70 in the bore in order to provide a control for the amount of clamping pressure applied to vane 12. In addition, member 66 is formed of rubber, or any equivalent cushioning material, in order to prevent damage to the upper surface of vane 12.

As clearly seen in FIG. 1, the third link 68 of break back clamp 54 is a generally U-shaped member pivotally interconnecting links 54 and 62. Link 68 has a bight portion 69 which bears against the top surface of link 62, when the clamp is closed, to assist in applying downward pressure on vane 12. It is thus seen that the vane 12 may be firmly positioned by a relatively simple mechanism for presenting its trailing edge to the assembly 50.

Dial gauge assembly 50 includes a dial gauge support platform 72 slidably mounted on the support assembly 74. This dial gauge assembly is mounted to slide parallel to the theoretically straight minimum trailing edge line established by support blocks 34 and 38, as previously discussed. Support assembly 74 includes a pair of end blocks 76 which support two cylindrical rods 78. Dial support platform 72 includes a pair of integral, depending bearing structures 80 which have longitudinally extending bores therein for receiving rods 78. In this manner, platform 72 can slide on rod 78 relative to vane 12. For simplicity of manufacture, rods 78 are mounted in blocks 76 to extend parallel to edge 31, and thus platform 72 slides parallel to the established minimum straight line trailing edge.

Dial gauge 81 is fixed on platform 72 by any convenient fastening means. The gauge illustrated in the drawing is of conventional construction, and includes an operating stem 82 which slides within a fixed collar 84. In addition, a contact wheel support bracket 86 having a generally U-shaped arm 87 is fixed at one end to collar 84. An L-shaped member 88 is slidably mounted on the bight portion of arm 87 and rotatably mounts contact wheel 90 about a generally vertical axis. Member 88 includes a leg 89 which is in bearing relation to the free end of stem 82 so that longitudinal movement of wheel 90 in bracket 87 will cause reciprocation of stem 82 and, thus, actuation of gauge 81. Alternatively, a dial gauge having a broad face contact wheel, similar to wheel 90, rotatably mounted directly on the end of the dial stem 82 may also be used. It is thus seen that the dial gauge is positioned and constructed to take a continuous reading along the trailing edge 14 of a vane 12 clamped on support platform 32.

Prior to measuring the vane however, dial gauge 80 must be calibrated. A calibration block 92, illustrated in its storage position in FIG. 1, and a calibration station 94 are provided on platform 32 for this purpose. Station 94 includes a pair of vertically extending dowels 96 and a threaded bore 98 through platform 32. Calibration block 92 includes a pair of bores 100 and a threaded bore 102 having a bolt 104 received therein. Bores 100 are complementary to dowels 96 and bolt 104 is adapted to be threaded in bore 98 to maintain the position of block 94 in station 94 during the calibration operation. A notch 106 having a machined vertical surface 108 is provided in a corner of block 92 for contacting wheel 90 and calibrating dial gauge 81.

The relative positions of dowels 96 and surface 108 are chosen such that the theoretical minimum straight line trailing edge of the class of vanes being measured lies in he plane of surface 108 when block 92 is mounted in station 94. By engaging contact wheel 90 with surface 108, the minimum chord length for each chord of the class of vanes being checked is correlated with the dial gauge, and the dial indicator may then be set at zero. In this manner, the actual trailing edge can be compared to the established theoretical minimum straight line trailing edge and, when vanes are later checked, any reading below zero at any point along the trailing edge of a vane will indicate a short chord and thus rejection of the vane.

To facilitate sliding of platform 72 on rods 78 a vertically extending handle 110 is provided. In addition, flexible dust covers 112 are provided on each side of platform 72 on rods 78 to prevent dirt or other deleterious matter from interfering with the smooth sliding motion of platform 72. A pair of stop rods 114 are also provided on plate 30 on either side of platform 72. These rods limit the path of travel of dial gauge 81 and are positioned such that motion of the gauge is stopped before wheel 90 engages the vane's buttresses. In this manner, damage to gauge 81 is avoided.

The process for measuring the vane is as follows: CAlibration block 92 is positioned on platform 32 at station 94 and dial gauge 81 is moved to a position opposite station 94. Contact wheel 90 is engaged with calibration surface 108 and the dial indicator of gauge 81 is set at zero. Calibration block 92 is then returned to its storage position and a vane 12 is seated on supports 34, 36 and 38. Vane 12 is positioned to properly engage contact dowels 40 and 41, and then clamped in place. Contact wheel 90 is then engaged with one end of trailing edge 14 and the platform 80 is slid along this edge permitting gauge 81 to transverse the vane trailing edge and take continuous readings during this traverse. Any reading below zero (L min) will indicate a short chord. All readings above zero will be acceptable except where they exceed L max.

The acceptable range of chord lengths for a particular class of vanes may be indicated by a green zone on the dial face (between zero and L max) whereas short and/or long chords (below L min and above L max) may be indicated by a red zone.

The above description of the invention is intended to be illustrative only, and various changes and modifications in the embodiment described may occur to those skilled in the art. These changes may be made without departing from the scope of the invention, and thus it should be apparent that the invention is not limited to the specific embodiments described or illustrated in the drawings.

What is claimed is:

1. Apparatus for determining variation in the chord length of an airfoil vane having a leading edge and a theoretically straight trailing edge, said apparatus comprising, a base support plate, gauge means slidably mounted on said support plate for movement along a straight line, a plurality of generally horizontally extending vane support members mounted on said plate for supporting a vane whose chord length variation is to be measured, two vane contact members mounted on said support plate at predetermined locations with respect to each other, said vane contact members being positioned respectively to engage the leading edge of a vane positioned on said support members at the respective buttress roots of said vane and to establish a predetermined theoretical minimum straight line trailing edge at a predetermined distance respectively from each of said vane contact members and parallel to the straight line along which said gauge means is adapted to move, a third vane contact member positioned to contact a vane seated on said support member at substantially right angles to the points of contact of said two vane contact members and said vane support members, said third vane contact member being positioned at a predetermined location with respect to said two vane contact members whereby a vane seated on said support members and engaged with each of the three vane contact members will have its buttress roots at its leading edge respectively contacting said two vane contact members and its theoretically straight trailing edge positioned substantially parallel to the straight line along which said gauge means is adapted to move, said gauge means including means for contacting the actual trailing edge of a vane positioned on said support members in engagement with said vane contact members and for determining the variation in the location of said actual trailing edge with respect to said theoretical minimum straight line trailing edge.

2. The apparatus of defined in claim 1 wherein at least two of said vane support members comprise generally L-shaped blocks having horizontally extending dowels thereon upon an airfoil vane may be supported and said two vane contact members respectively comprise vertically extending dowels mounted on said blocks.

3. The apparatus as defined in claim 2 wherein said third vane contact member comprises a vertically extending dowel mounted on one of said blocks.

4. Apparatus as defined in claim 3 including means for limiting the sliding movement of said gauge means to a path of travel parallel to and extending between said two vane contact members whereby said vane contacting means is limited to contact with the trailing edge of a vane seated on said support members between the buttress roots thereof only.

5. The apparatus as described in claim 17 including, means for locating a contact surface along said theoretical straight line trailing edge in position to engage said means for contacting the actual trailing edge of a vane seated on said support members to thereby facilitate calibration of said gauge whereby said gauge reads zero when said engaging means engages a portion of a vane trailing edge lying on said theoretical straight line trailing edge.

6. The apparatus as described in claim 5 including means for clamping said vane in position on said support members.

* * * * *

UNITED STATES PATENT OFFICE
CERTIFICATE OF CORRECTION

Patent No. 3,639,992          Dated February 8, 1972

Inventor(s) Charles Dabrush and Irving Strauss

It is certified that error appears in the above-identified patent and that said Letters Patent are hereby corrected as shown below:

Column 5, line 29 (Claim 1, line 21), --outside of the line defined by the two vane contact members-- should be inserted after "positioned";

Column 6, line 8, (Claim 2, line 1) wherein "of" should be --as--;

Column 6, line 23 (Claim 5, line 1) wherein "17" should be --3--;

Column 6, line 29 (Claim 5, line 7) wherein --minimum-- should be inserted after "theoretical".

Signed and sealed this 20th day of June 1972.

(SEAL)
Attest:

EDWARD M. FLETCHER, JR.
Attesting Officer

ROBERT GOTTSCHALK
Commissioner of Patents